US009478042B1

(12) United States Patent
Khandpur

(10) Patent No.: US 9,478,042 B1
(45) Date of Patent: Oct. 25, 2016

(54) DETERMINING VISIBILITY OF RENDERED CONTENT

(71) Applicant: Google Inc., Mountain View, CA (US)

(72) Inventor: Sundeep Singh Khandpur, Sunnyvale, CA (US)

(73) Assignee: Google Inc., Mountain View, CA (US)

( * ) Notice: Subject to any disclaimer, the term of this patent is extended or adjusted under 35 U.S.C. 154(b) by 116 days.

(21) Appl. No.: 14/458,082

(22) Filed: Aug. 12, 2014

(51) Int. Cl.

| | |
|---|---|
| ***G06T 7/40*** | (2006.01) |
| ***G06Q 30/02*** | (2012.01) |
| ***G09G 5/02*** | (2006.01) |
| ***G09G 5/39*** | (2006.01) |
| ***G06F 3/0481*** | (2013.01) |
| ***H04N 1/60*** | (2006.01) |
| ***G06T 11/00*** | (2006.01) |

(52) U.S. Cl.
CPC ........... *G06T 7/408* (2013.01); *G06Q 30/0242* (2013.01); *G06T 2207/10004* (2013.01); *G06T 2207/10024* (2013.01)

(58) Field of Classification Search
CPC combination set(s) only.
See application file for complete search history.

(56) References Cited

U.S. PATENT DOCUMENTS 7,280,120 B2 10/2007 Ecob
8,437,556 B1 5/2013 Saisan
9,094,615 B2 * 7/2015 Aman .................. G01S 3/7864
2011/0034176 A1 * 2/2011 Lord ................ G06F 17/30244 455/450
2013/0238724 A1 * 9/2013 Cunningham .......... H04L 51/24 709/206
2013/0345980 A1 * 12/2013 van Os ............. G01C 21/3626 701/538
2014/0176591 A1 * 6/2014 Klein .................... G09G 3/003 345/589
2014/0359656 A1 * 12/2014 Banica ................. H04N 21/812 725/32
2016/0021412 A1 * 1/2016 Zito, Jr. ............... H04N 21/251 725/13

FOREIGN PATENT DOCUMENTS

WO WO2008017058 A3 12/2008

* cited by examiner

*Primary Examiner* — Wesner Sajous
(74) *Attorney, Agent, or Firm* — Foley & Lardner LLP; John D. Lanza

(57) ABSTRACT

Methods, systems, and apparatus, including computer programs encoded on a computer storage medium, for determining whether content rendered on a display is actually visible to a user. In one aspect, a method includes generating and transmitting content presentation data that causes a user device to present, at a display and over a first time period, a content item that includes one or more content portions that are each designated for presentation in a respective first color. For a second time period, the respective first color of a particular content portion is changed to a second color. Visual representation data that includes a visual representation of the display during the second time period is generated and provided. Using the visual representation, an amount of the content item that was visible at the display is determined based on an amount of the particular content portion presented in the second color.

18 Claims, 6 Drawing Sheets

500

Present a content item for a first time period — 502

Change the color of a particular content portion of the content item for a second time period — 504

Obtain a screenshot of the display during the second time period — 506

Generate and transmit data that includes the screenshot — 508

Change the color of the particular content portion back to the first color — 510

DETERMINING VISIBILITY OF RENDERED CONTENT

BACKGROUND

The Internet enables access to a wide variety of resources. For example, video, audio, web pages directed to particular subject matter, news articles, images, maps, and other resources are accessible over the Internet. The wide variety of resources that are accessible over the Internet has enabled opportunities for content distributors to provide content items with resources that are requested by users. Content items are units of content (e.g., individual files or a set of files) that are presented in/with resources (e.g., web pages, applications, etc.). An advertisement is an example of a content item that advertisers can provide for presentation with particular resources, such as web pages and search results pages. An advertisement can be made eligible for presentation with specific resources and/or resources that are determined to match specified distribution criteria, such as distribution keywords.

SUMMARY

This specification describes technologies relating to determining whether a content item rendered on a display was actually visible.

In general, one innovative aspect of the subject matter described in this specification can be embodied in methods that include the actions of generating and transmitting content presentation data that causes a user device to: present, at a display and over a first time period, a content item that includes one or more content portions that are each designated for presentation in a respective first color for the content portion; change, for a second time period that is after the first time period, the respective first color of a particular content portion to a second color that is different from the respective first color of the particular content portion; and generate and provide visual representation data that includes a visual representation of the display during the second time period in which the respective first color of the particular content portion is changed to the second color, the visual representation data being provided in response to receiving the content presentation data; receiving the visual representation data from the user device; and determining, using the visual representation, an amount of the content item that was visible at the display based on an amount of the particular content portion presented in the second color. Other embodiments of this aspect include corresponding systems, apparatus, and computer programs, configured to perform the actions of the methods, encoded on computer storage devices.

These and other embodiments can each optionally include one or more of the following features. In some aspects, determining the amount of the content item that was visible at the display includes: identifying a first number of pixels of the particular content portion that was changed to the second color; determining, using the visual representation, a second number of pixel-sized areas that were presented in the second color; and determining the amount of the content item that was visible at the display based on a comparison of the first number to the second number.

In some aspects, determining the amount of the content item that was visible at the display can include identifying in the visual representation an expected presentation location of the particular content portion; and determining a number of pixel-sized areas in the expected presentation location that match the second color for the particular content portion.

In some implementations, the content item includes an advertisement. Some aspects include determining that the amount of the advertisement that was visible at the display satisfies a specified visibility threshold and generating and transmitting data that indicates that an impression of the advertisement occurred in response to determining that the amount of the content item that was visible at the display satisfies the specified visibility threshold.

Some aspects include receiving multiple visual representations from the user device. Each particular visual representation can be obtained at different times and can be associated with a timestamp that specifies a time at which the particular visual representation was obtained. A determination can be made that one or more of the visual representations include at least a specified amount of the content item. A determination can be made that an amount of time that the content item was visible based on the timestamps for each of the one or more visual representations that include at least a specified amount of the content item.

Aspects can include determining, using the visual representation, that a specified amount of the content item was visible and performing an action in response to determining that the specified amount of the content item was visible. In some aspects, the action includes generating and sending data to the user device that causes the user device to delete the content item.

Aspects can include generating and sending data to the user device that causes the user device to delete the content item in response to determining that the amount of the content item that was visible at the display satisfies a specified visibility threshold.

Aspects can include changing the first color of the particular content portion to the second color includes adjusting one or more RGB color values that define the respective first color for the particular content portion to produce the second color. Each of the one or more RGB color values can be adjusted by a specified amount.

Generating the visual representation can include capturing a screenshot of an area of the display in which the content item is presented. In some aspects, the content presentation data causes the user device to change, after the second time period, the second color of the particular content portion back to the respective first color of the particular content portion. In some aspects, the visual representation of the display includes a visual representation of an off screen buffer that includes data that represents content designated for presentation at the display.

Particular embodiments of the subject matter described in this specification can be implemented so as to realize one or more of the following advantages. Content item providers and user interface designers can learn whether certain content was actually visible to users based on screenshots of a masked version of the content item. By comparing pixel colors of a content item, or portion of a content item, to an expected pixel color, the visibility of a content item can be determined more quickly than comparing two images of the content item. This also allows a system used to determine the visibility of content items to use less processing power and to be scaled to handle many visibility checks. Advertisers can receive a more accurate count of advertisement impressions that were actually viewed by users. User interface design technologies can be improved, for example, by incorporating features described in this document into user interface design tests to determine whether particular portions of content have been presented in a user interface. Content distribution technologies can be improved by analyzing the presentation of content using features described in this document to reliably detect whether particular portions of content have been presented on a display. User engagement evaluation technologies can be improved by incorporating features described in this document, for example, by reliably determining an extent of user engagement with particular content.

In many different contexts, knowledge of whether content was visible on a display can be beneficial. For example, user interface designers may want to ensure that user interface elements are being presented during user interface testing. In another example, advertisers would like to know that advertisements presented on a web page are actually visible to users. Features disclosed in this document can facilitate the identification of whether a content item rendered at a display was visible.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

This document describes systems and techniques for determining whether, and how much of, a content item (or a portion of specified content) was visible at or on a display. Content items are units of content that are presented at a display. Example content items include advertisements, search results, images, videos, text, documents, and user interface elements (e.g., buttons, controls, shapes, etc.).

The amount of a content item visible at a display can be determined using a screenshot of the display that is presenting the content item. A screenshot is an image (or another visual representation) that depicts the visible objects presented at a display. The terms screenshot, visual representation, and image are used interchangeably herein to refer to a visual representation of a display. Prior to the screenshot being captured, the color of at least a portion of the content item can be changed from a first color to a second color that is different from the first color. For example, a yellow content item may be changed such that the content item is presented in a slightly lighter yellow for a brief period of time (e.g., less than a second) and then returned to its original shade of yellow. In this way, the change in color may not be noticed (or may be less noticeable) by a user viewing the content item. While the content item is presented in the different color, the screenshot can be captured. This screenshot can then be analyzed to determine the amount of the content item that was visible at the display. In some implementations, this analysis includes determining, using the screenshot, how many pixels of the display match the second color of the content item.

Actions can be taken based on whether the content item was visible and/or the amount of the content item that was visible. For example, a determination may be made that an advertisement impression occurred (e.g., the content item was sufficiently exposed to constitute a presentation of the content item to a user) based on a determination that at least a specified amount of the advertisement was visible at a display. Data indicating that an impression occurred can then be generated and transmitted to the advertiser. In another example, a temporary content item may be deleted from a device in response to determining that the content item was visible at a display of the device for a specified amount of time. In some implementations, users can consent to the use of screenshots to determine whether content items (e.g., advertisements) have been presented on a display.

Figure 1:
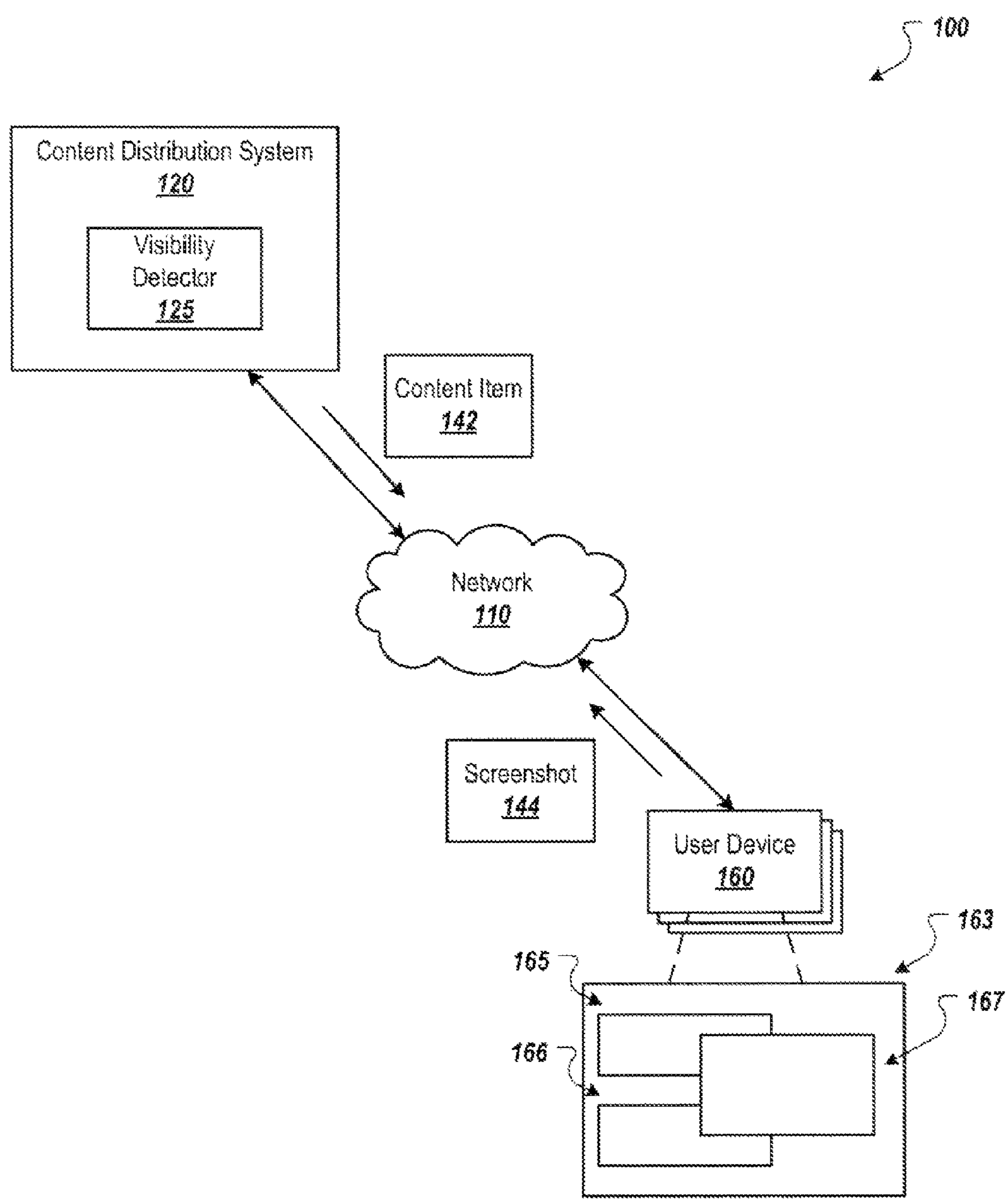
FIG. 1 is an example environment in which a visibility detector determines an amount of a rendered content item that was visible at a display.

FIG. 1 is an example environment 100 in which a visibility detector 125 determines an amount of a rendered content item that was visible at a display. The example environment 100 includes a network 110 such as a local area network (LAN), wide area network (WAN), the Internet, or a combination thereof. The network 110 connects a content distribution system 120 to user devices 160.

A user device 160 is an electronic device that is capable of requesting and receiving content over the network 110. Example user devices 160 include personal computers, mobile communication devices (e.g., smartphones, tablet computing devices, and/or smart watches), and other devices that can send and receive data over the network 110. A user device 160 typically includes a user application, such as a web browser, to facilitate the sending and receiving of data over the network 110. The web browser can enable a user to display and interact with text, images, videos, music, and other information typically located on a web page at a website. The user devices 160 can also include applications (also referred to as apps) that can enable a user to display and interact with similar content.

The content distribution system 120 is one or more electronic devices capable of sending content items 142 to user devices 160 over the network 110. The content items 142 can include advertisements, search results, images, videos, text, and user interface elements (e.g., buttons, controls, shapes, etc.), documents, and/or other appropriate types of content items. The content distribution system 120 may be a system of one or more computers. For example, the content distribution system 120 may send content items (e.g., advertisements) to user devices 160 in response to content item requests received from the user devices 160 or from another device. In some implementations, the content distribution system 120 is another user device. For example, users may use the user devices to send content items (e.g., text, images, videos, etc.) to each other.

In some implementations, content items 142 are identified for presentation with a particular resource only after a particular portion of code in the particular resource has been executed. For example, the particular resource may include code that when executed by a user device causes the user device to request a content item from a different location than the network location of the particular resource. Upon receiving the content item 142 from the different location, the user device 160 can populate the resource with the content item 142. In some implementations, content items 142 are identified for presentation independent of a particular portion of code in the particular resource.

The user device 160 can receive content items 142 and present the content items at a display 163 of the user device 160. For example, the display 163 presents three content items 165-167. In this example, the content item 167 is partially obstructing the visibility of content items 165 and 166. Content items may obstruct other content items in various ways. For example, a user permission control dialog box may be presented over a content item based on the need for user's permission to perform an action. In a particular example, a permission control dialog box may request instructions for running an application based on a content item attempting to initiate the application.

In another example, two different applications may both attempt to present content at the display. In this example, the application that sends content for display last ("later application") may have its content presented over the content of the other application ("earlier application"). Thus, even though content from the earlier application (e.g., that sends content for display first) is rendered in the earlier application, the content for the earlier application may be occluded by content from the later application.

The content distribution system 120 includes a visibility detector 125 that can determine whether a content item was visible at a display and/or an amount of the content item that was visible at the display. The visibility detector 125 can make these determinations based on a screenshot 144 of the display at which the content item 142 was to be presented. For example, the content distribution system 120 may generate and send data that causes the user device 160 to display the content item 142 and to obtain and send a screenshot 144 of the user device's display to the content distribution system 120. In some implementations, users can control whether and how screenshots of their devices are obtained and used (e.g., whether the screenshots are transmitted to another device).

The data may also cause the user device 160 to adjust the content item 142 for the screenshot. For example, the data may cause the user device 160 to adjust the color of one or more areas or portions of the content item 142 (or a portion of a user interface) for a period of time during which the screenshot 144 is captured. In this example, the user device 160 may present the content item 142 in its original or normal color(s) for a first time period. To take the screenshot 144, the user device 160 may then adjust the color of one or more content portions of the content item 142 for a second time period. A content portion is a portion of the content item (or a portion of a user interface element), e.g., a particular area of the content item that may be a continuous area or a non-continuous area. While the content item's colors are adjusted, the user device 160 can capture a screenshot 144 of the display 163 or a portion of the display 163 where the content item is presented. The user device 160 may then return the content item 142 to its original color(s) and send the screenshot 144 to the content distribution system 120.

The content portion for which the color is adjusted can be the entire content item. For example, a content item may include one color (e.g., solid colored user interface element) or multiple colors (e.g., an advertisement with an image or an advertisement with text that is a different color than the advertisement's background). For a content item that includes one color, that color can be adjusted over the entire content item or over a portion of the content item. For example, a blue content item may be adjusted to a slightly lighter or slightly darker blue. For a content item that includes multiple colors, each of the colors may be adjusted. For example, each color may be adjusted such that the colors are all lighter or darker.

In some implementations, each color may be defined by RGB color values, a CMYK color model, (or values of another color coding technique). In an RGB color scheme, the color of a pixel is based on a red value, a green value, and a blue value. Each value may be an integer from 0-255. Each color of the content item may be adjusted by adjusting one or more of the red, green, and blue values for that color by a specified amount. For example, each color of the content item may be adjusted by reducing the red value for the color by two. Or, some colors of the content item may be adjusted by different amounts than other colors of the content item. The amount to adjust each color value may be specified in the data generated and sent by the content distribution system 120.

Figure 3:
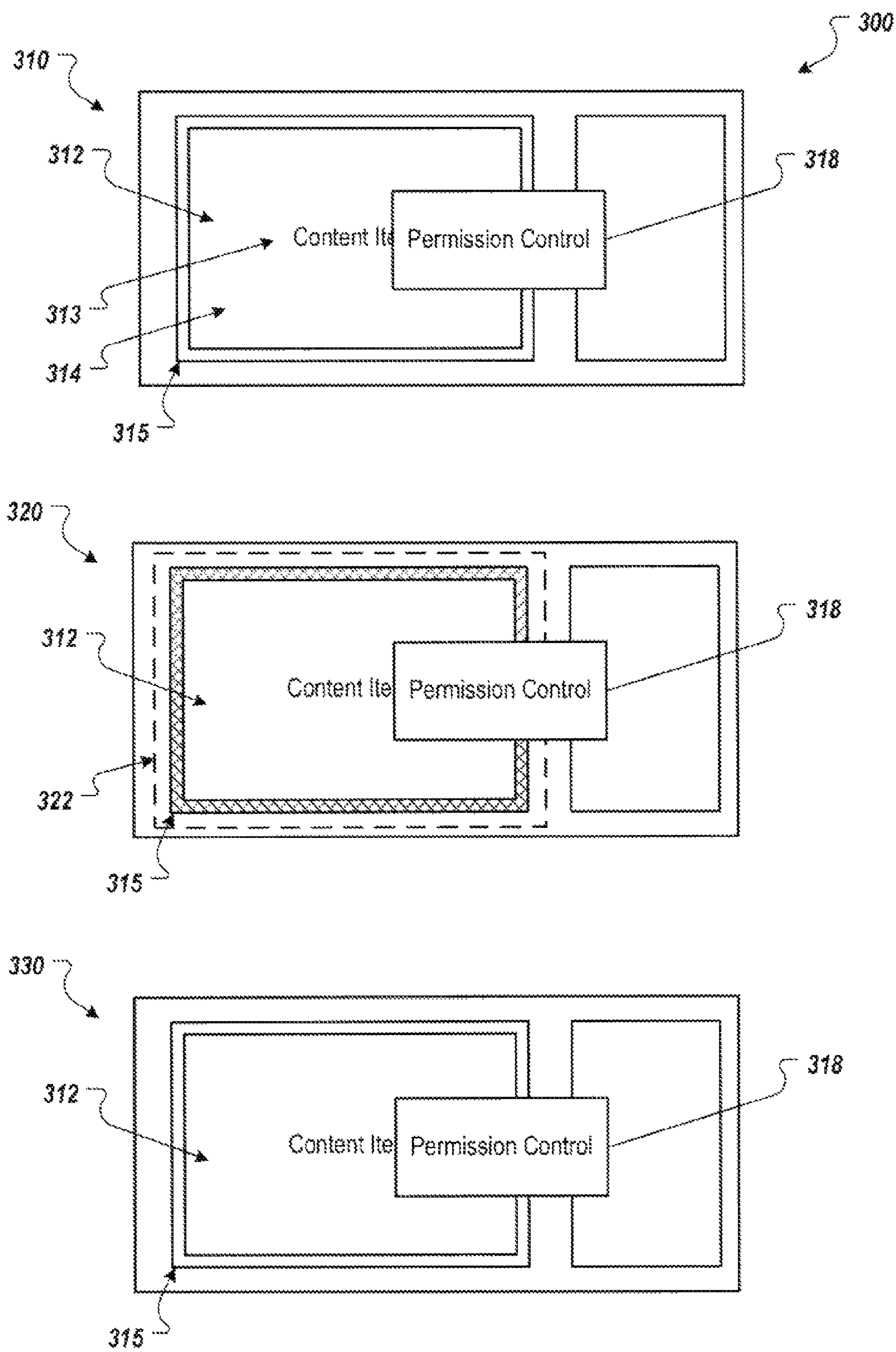
FIG. 3 is another example sequence of screen views that each depicts content presented at a display.

The content portion for which the color is adjusted may be a continuous portion of the content item that is less than the entire content item. For example, as shown in FIG. 3 and described below, the color of a border at the perimeter of a content item can be adjusted for the screenshot 144. The border may be continuous around the content item. In another example, the color of one continuous area, such as an area located at one side of the content item, can be adjusted.

The content portion for which the color is adjusted may be a non-continuous portion of the content item that is less than the entire content item. For example, the color of multiple individual content portions (e.g., multiple disjoint sets of pixels) of the content item may be adjusted for the screenshot. In a particular example, the color of a square or circle located at each corner of a rectangular content item may be adjusted.

The visibility detector 125 can analyze the screenshot 144 to determine whether the content item 142 was visible and/or an amount of the content item 142 was visible. The visibility detector 125 may analyze the area of the screenshot 144 where the content portion for which the color was adjusted to determine how much of that area matches the adjusted color. For example, the content item may be designated for presentation in the center of the display and the content item may have a particular shape and size. In addition, the content portion for which the color was adjusted may be the entire content item. In this example, the visibility detector 125 may identify the area of the screenshot where the content item should be depicted based on the designated location and its shape and size. The visibility detector 125 may then compare the color of that area of the screenshot to the expected color for the content portion based on the adjustment to the color. In some implementations, the visibility detector 125 performs pixel-by-pixel comparison of the area of the screenshot to the expected color. In this example, the visibility detector 125 may compare the color at each pixel-sized area of the screenshot being analyzed to the expected color. A pixel-sized area is an area of the screenshot that corresponds to, or is the same size as, the area of the display covered by a pixel. Based on the comparisons, the visibility detector 125 may determine the number of pixel-sized areas that match the expected color and/or percentage of pixel-sized areas that match the expected color.

In examples in which the content portion for which the color was adjusted includes multiple colors that were adjusted, the visibility detector 125 may perform a similar comparison for each of the multiple colors. For example, a content portion for which the color was adjusted may include yellow text on a blue background. For the screenshot, the blue and yellow colors may have been changed to a lighter blue and lighter yellow, respectively. The visibility detector 125 may identify the expected location of the text in the screenshot and the expected location of the background in the screenshot. The visibility detector 125 may then perform a pixel-by-pixel comparison for the text to determine how many or the percentage of the pixels in the expected location of the text is the lighter shade of blue. Similarly, the visibility detector 125 may perform a pixel-by-pixel comparison for the background to determine how many or what percentage of the pixels in the expected location of the background is the lighter shade of yellow. The results of the analysis for each color can then be combined to determine an aggregate result for the content item. For example, the number of matching pixel-sized areas for each color can be summed to determine a total number of matching pixels. This total number of matching pixels can then be divided by the total number of pixel-sized areas analyzed for the content item to determine the percentage of matching pixels for the content item.

The visibility detector 125 can use the number or percentage of pixels that match the expected color of the content portion(s) to determine the amount of the content item that was visible. If the content portion for which the color was adjusted is the entire content item, then the percentage of pixels that match the expected color is the same as the percentage of the content item that was visible. If the content portion for which the color was adjusted is less than the entire content item, then the results of the analysis can be extrapolated. For example, if 30% of the analyzed pixels matched, the visibility detector 125 may determine that 30% (or some other portion) of the content item was visible. If the amount or percentage of matching pixels satisfies a specified threshold, the visibility detector 125 may determine that the content item was visible.

In some implementations, the visibility detector 125 may determine, for each adjusted color, the amount (e.g., area) of the screenshot that includes the expected color for the content portion and compare the determined area to an expected amount of the screenshot that should have included the expected color. For example, the visibility detector 125 may identify a total number of pixel-sized areas that should have been in the expected color and a total number of pixel-sized areas of the screenshot that were actually presented in the expected color. The amount of the content item that was visible can then be based on a ratio between the total numbers.

The content distribution system 120 can perform actions based on the amount or percentage of the content item that was visible. For example, if at least a specified amount of an advertisement was visible, the content distribution system 120 may determine that an advertisement impression occurred for the advertisement. In response, the content distribution system 120 may generate and transmit, to an advertiser of the advertisement, data (or a content item performance analysis system) that indicates that the impression occurred. The content distribution system 120 may also charge the advertiser for the impression. For example, the content distribution system 120 may maintain a count of the number of impressions for advertisements based on the advertisements' visibility. At the end of a billing period, the advertiser may be charged based on the impression count.

Figure 6:
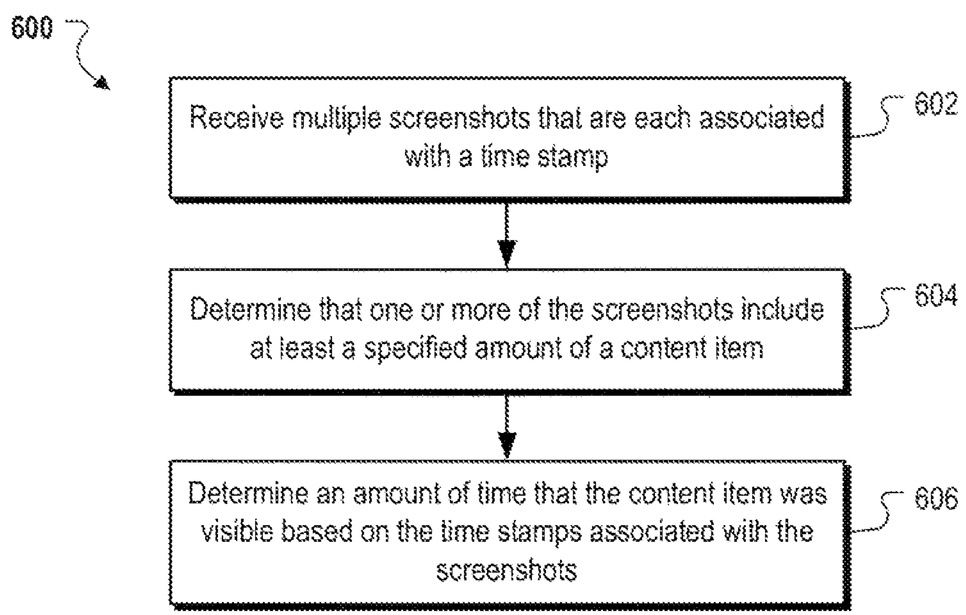
FIG. 6 is a flow chart of an example process for determining an amount of time in which a content item was visible at a display.

Another example action includes performing a particular action on the content item in response to determining that the content item was visible or at least a specified amount of the content item was visible. For example, a message or image may be designated for display to a user for a specified amount of time. In response to determining that the message (e.g., e-mail or text message) or image was visible for the specified amount of time, the message or image may be deleted or removed from the display. This technique can be used for secure content handling, for example, to ensure that secure content cannot be accessed after it has been viewed by a user. An example process for determining how long a content item is visible is illustrated in FIG. 6 and described below.

In some implementations, the visibility detector 125 is part of a user device (e.g., the user device 160) or other device on which content is presented. For example, a user interface or software development system may include and use the visibility detector 125 to determine whether content items (e.g., user interface elements) are visible at a display and/or whether the content items are being presented at the appropriate locations on the display. In this example, the screenshots can be obtained and analyzed at the device that includes the visibility detector 125. In another example, the content distribution system 120 may send a request to the user device 160 that causes the user device 160 to obtain a screenshot of the user device's display, analyze the screenshot to determine the amount of a content item that is visible in the screenshot, and provide data to the content distribution system 120 that specifies the amount of the content item that was visible in the screenshot. The visibility detector 125 at the user device 160 can perform the analysis and cause the user device 160 to send the data specifying the amount of the content item that was visible to the content distribution system 120.

The visibility detector 125 can be used for user interface design. For example, the evaluation of user interfaces can be automated by determining whether particular user interface elements that should have been presented on a screen are actually visible and not occluded by other elements or windows. A user interface testing process may include presenting certain content items (e.g., user interface elements) at a display based on simulated (or actual) user interaction. A screenshot can be obtained for steps in the testing process and/or for particular user interface elements. These screenshots can then be analyzed to determine whether the appropriate user interface elements were visible at the appropriate time and/or place on the display.

Figure 2:
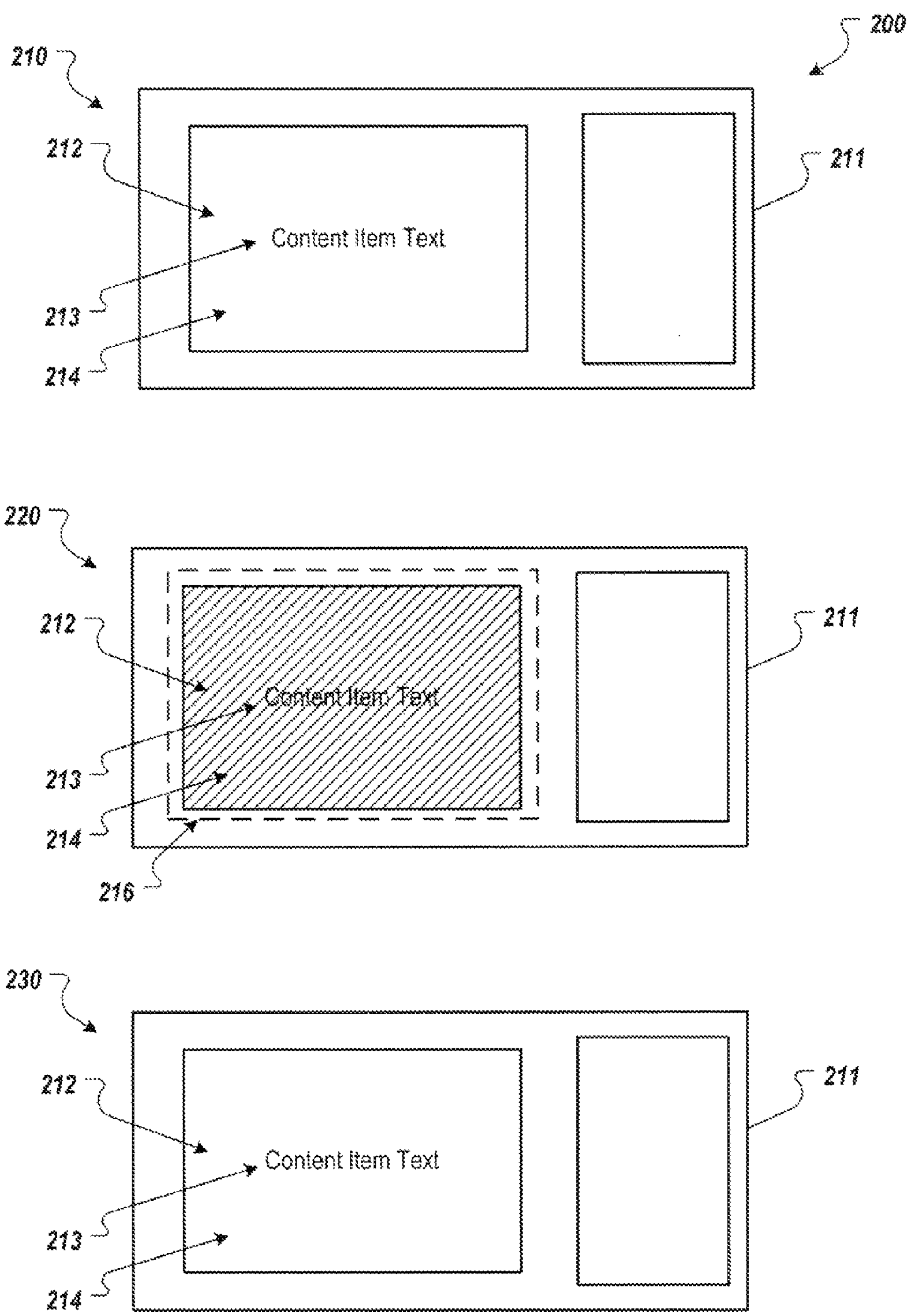
FIG. 2 is an example sequence of screen views that each depicts content presented at a display.

In some implementations, the content distribution system 120 provides data that causes the user device 160 to obtain and analyze a screenshot 144. For example, the data can include instructions that cause the user device 160 to perform the functions of the visibility detector 125. These functions can include, for example, determining the amount of the screenshot 144 that matches the adjusted color(s) of the content item 142 and optionally performing an action based on the determination. For example, the user device 160 may determine how long a message or image was visible, and delete the message or image in response to determining that the message or image being visible for at least a specified amount of time. FIG. 2 is an example sequence 200 of screen views that each depicts content presented at a display 211. In the screen view 210, a content item 212 is presented at the display 211. The example content item 212 includes content item text 213 on a background 214. In this example, the entire content item 212 is visible as no other content is obstructing the view of the content item 212. In the screen view 210, each content portion of the content item 212 may be presented in a respective first color for a first time period. For example, the content item text 213 may be a first content portion that is presented in white. Similarly, the background 214 may be a second content portion that is presented in green. The first time period may last from the time the content item 213 is first rendered at the display 211 until a second time period described below.

In the screen view 220, the colors of the content item 212 are adjusted for a second time period that follows the first time period. For example, the colors of the content item 212 may be adjusted so that a screenshot of the content item 212 can be captured. The color of the content item text 213 may be changed from white to a light gray and the color of the background 214 may be changed from green to a lighter shade of green. The second time period may be brief, e.g., less than a second in duration, and substantially shorter than the first time period.

While the colors are adjusted, a screenshot may be taken of the display 211. In some implementations, a screenshot of an area 216 where the content item 212 is rendered is captured rather than the entire display 211. In some implementations, a screenshot is captured of the entire display 211 (or most of the display 211), but only the area 216 is analyzed to determine how much of the content item 212 was visible.

In the screen view 230, the content item 212 is returned to its original colors for a third time period that follows the second time period. For example, the content item text 213 may be changed back to white and the background 214 may be changed back to green on the display 211. The third time period may last until the content item 212 is no longer rendered at the display 211.

FIG. 3 is another example sequence of screen views that each depicts content presented at a display 311. In the screen view 310, a content item 312 is presented at the display 311. The example content item includes content item text 313 on a background 314. The content item 312 also includes a border 315 around the perimeter of the background 314. In this example, the visibility of the content item 312 is partly obstructed by a permission control dialog box 318.

In the screen view 310, each content portion of the content item 212 may be presented in a respective first color for a first time period. For example, the content item text 313 may be a first content portion that is presented in white. Similarly, the background 314 may be a second content portion that is presented in green and the border 315 may be a third content portion that is also presented in green. The first time period may last from the time the content item 313 is first rendered at the display 311 until a second time period.

In the screen view 320, the color of the border 315 is adjusted for a second time period that follows the first time period. For example, the color of the border 315 may be changed from green to a slightly darker green. While the color of the border 315 is adjusted, a screenshot may be taken of the display 311. In some implementations, a screenshot of an area 316 where the content item 312 is rendered is captured rather than the entire display 311. In some implementations, a screenshot is captured of the entire display 311 (or most of the display 311), but only the area 316 is analyzed to determine how much of the content item 312 was visible. By only adjusting the color of a portion of the content item 312, the analysis performed to determine the amount of the content item that was visible may be quicker and less data intensive than evaluating characteristics of the entire content item 312.

In the screen view 330, the content item 312 is returned to its original colors for a third time period that follows the second time period. For example, the color of the border may be changed back to its original shade of green. The third time period may last until the content item 312 is no longer rendered at the display 311.

Figure 4:
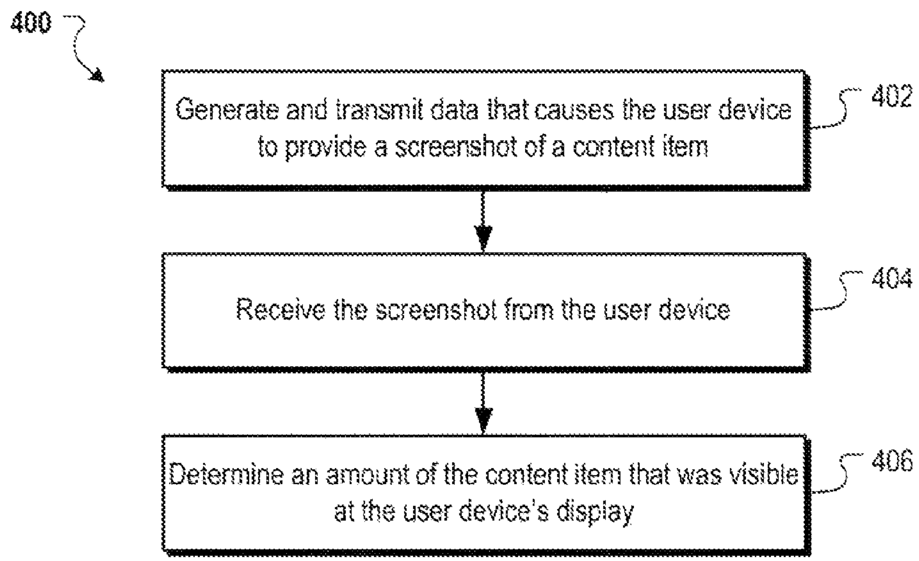
FIG. 4 is a flow chart of an example process for determining an amount of a content item that was visible at a display.

FIG. 4 is a flow chart of an example process 400 for determining an amount of a content item that was visible at a display. Operations of the process 400 can be implemented, for example, by a data processing apparatus, such as the visibility detector 125 of FIG. 1.

The process 400 can also be implemented by instructions stored on computer storage medium, where execution of the instructions by a data processing apparatus cause the data processing apparatus to perform the operations of the process 400.

Content presentation data is generated and transmitted to a user device (402). The content presentation data can cause the user device to present a content item at a display. For example, the content presentation data may include the content item and instructions that cause the user device to present the content item. The content presentation data may be generated in response to a content item request. For example, content presentation data for presenting an advertisement may be generated and transmitted to a user device in response to an advertisement request.

The content presentation data may also include instructions that cause the user device to adjust the color of a content portion of the content item, capture a screenshot of the display while the color is adjusted, and transmit the screenshot. For example, the instructions may cause the user device to generate visual representation data that includes the screenshot and transmit the visual representation data to another device, e.g., a content distribution system that transmitted the content item to the user device. In some implementations, the content presentation data includes instructions that cause the user device to perform the example process 500 illustrated in FIG. 5 and described below.

The screenshot is received from the user device (404). For example, visual representation data that includes the screenshot may be received from the user device.

An amount of the content item that was visible at the user device is determined based on the screenshot (406). For example, an image comparison tool may be used to compare the color(s) of the screenshot to the expected color(s) of the content item based on the adjustment made to the color(s). This may be accomplished using a pixel-by-pixel comparison for each adjusted color, as described above. For example, the area of the screenshot of each content portion that was adjusted can be analyzed to determine the amount or percentage of that area matches the adjusted color for that area.

In some implementations, the area of a content portion may be identified based on data received from the user device. For example, some user devices allow users to zoom into content rendered at a display. In this example, the user device can provide data that indicates the location on the display and/or in the screenshot where the content item was rendered.

In some implementations, the location of the content portions is not used to determine the amount of the content portion that was visible at the display. Instead, the screenshot may be analyzed to determine the total number of pixel-sized areas match each adjusted color. For each adjusted color, the number of pixel-sized areas that match the adjusted color is compared to a number of pixels presented in the adjusted color. Or, a total number of pixel-sized areas that match one of the adjusted colors may be compared to a total number of pixels that were adjusted. For example, the percentage of the content item that was visible may correspond to, or be proportional to, a ratio between the total number of pixel-sized areas that match one of the adjusted colors and the total number of pixels that were adjusted. The number of pixels that were adjusted or that presented an adjusted color may be based on user zooming. For example, if the user has zoomed into a particular portion of the content item, then the number of pixels for that particular portion is increased. Thus, if the color of the particular portion is adjusted, then more pixels would also be adjusted.

Figure 5:
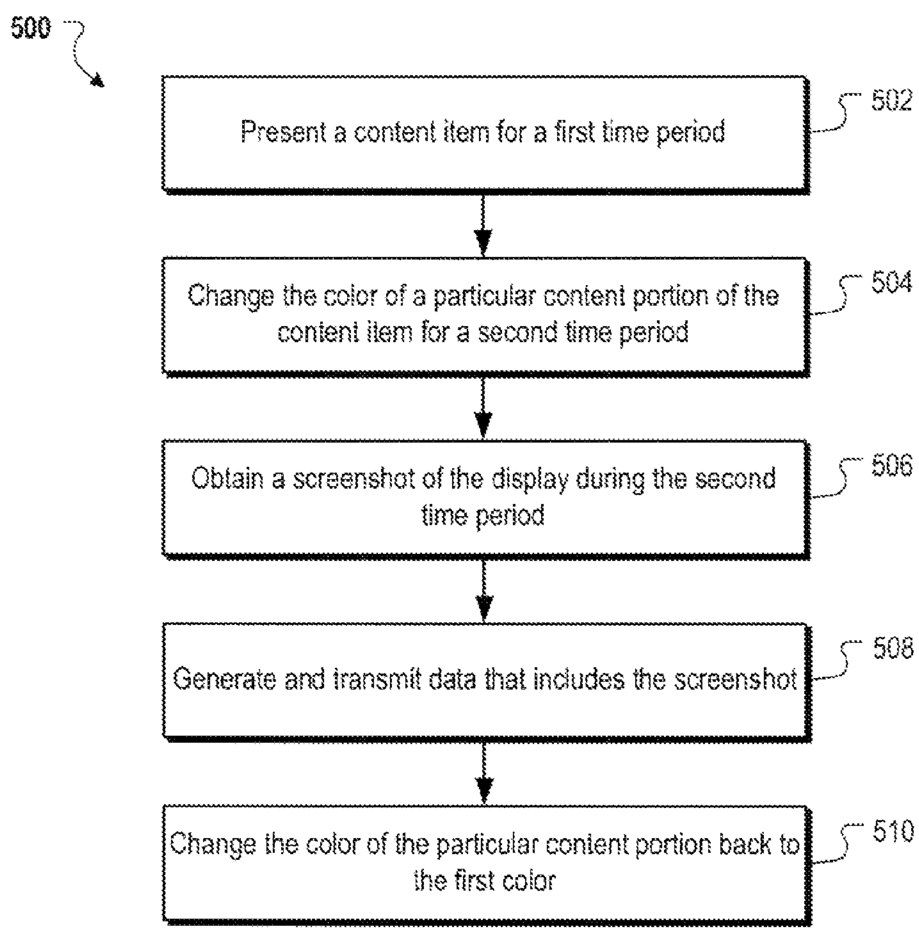
FIG. 5 is a flow chart of an example process for obtaining and sending a screenshot of a content item.

FIG. 5 is a flow chart of an example process 500 for obtaining and sending a screenshot of a content item. Operations of the process 500 can be implemented, for example, by a data processing apparatus, such as the user device 160 of FIG. 1. The process 500 can also be implemented by instructions stored on computer storage medium, where execution of the instructions by a data processing apparatus cause the data processing apparatus to perform the operations of the process 500.

A content item is presented for a first time period (502). During the first time period, the content item may be presented in its original color(s). For example, the content item may include one or more content portions that are each designated for presentation in a respective first color. The content item may be presented based on data received from another device.

The color of a particular content portion of the content item is changed for a second time period (504). The particular content portion may be the entire content item or a portion of the content item. The particular content portion may be changed from its first color to a second color. If the content portion includes multiple colors, each or a portion of the multiple colors may be changed. During the second time period, the display may be in a temporary state in which the color of the particular content portion is changed to the second color.

The color(s) may be changed based on data received from another device, e.g., a device that sent the content item. In some implementations, the data may indicate that each of the color(s) should be changed to a specific color. In some implementations, the data may indicate that each color should be changed by adjusting one or more RGB color values for the color by a specified amount. For example, the data may indicate that the green value of each color should be adjusted by a specified amount. Each color can then be changed at the display for the second time period based on the received data. The second time period may be brief, e.g., for two seconds or less.

A screenshot is obtained of the display during the second time period (506). The screenshot may be of the entire display or most of the display. Or, the screenshot may be of an area of the display where the content item is rendered. For example, a user device rendering the content item has instructed the display to present the content item in a particular location on the display. The user device can then capture a screenshot of that particular location.

Data is generated and transmitted that includes the screenshot (508). For example, the data may be transmitted to a content distribution system or other device that includes a visibility detector.

The color of the particular portion of the content item is changed back to its respective first color (510). At this point, the content item is being rendered in its original colors for a third time period that follows the second time period. The third time period may last until the content item is no longer rendered at the display.

FIG. 6 is a flow chart of an example process 600 for determining an amount of time in which a content item was visible at a display. Operations of the process 600 can be implemented, for example, by a data processing apparatus, such as the visibility detector 150 of FIG. 1. The process 600 can also be implemented by instructions stored on computer storage medium, where execution of the instructions by a data processing apparatus cause the data processing apparatus to perform the operations of the process 600.

Multiple screenshots are received (602). For example, the screenshots may be received from a user device that is presenting a content item. Each screenshot can be of the entire display at which the content item is being presented or of an area of the display where the content item is being presented. Each screenshot can also include or be associated with a time stamp that indicates a time at which the screenshot was obtained. For example, each screenshot may include metadata that indicates the time stamp.

For each screenshot, the user device may adjust the color of at least one content portion of the content item. For example, the color of the content portion may be adjusted periodically based on a time period and a screenshot may be obtained each time the color is adjusted based on the time period.

A determination is made that one or more of the screenshots include at least a specified amount of the content item (604). For example, each screenshot may be analyzed to determine an amount of the content item that was visible in the screenshot using the techniques described above. For each screenshot, a determination is made whether the amount of the content item that was visible satisfies (e.g., meets or exceeds) a specified threshold amount.

An amount of time that the content item was visible is determined based on the time stamps for the one or more screenshots that include at least the specified amount of the content item (606). If two or more sequential screenshots include the specified amount of the content item, then it may be determined that the content item was visible from the time stamp of the first screenshot of the sequence until the last screenshot of the sequence. If there are multiple sequences of screenshots for which each sequence includes screenshots that each include the specified amount of the content item, these time periods may be combined (e.g., summed) to determine a total amount of time in which the content item was visible. For example, some other content may obstruct the visibility of the content item for a brief period of time although the content item was entirely visible before and after the brief period of time. The amount of time in the time period before and the amount of time in the time period after this brief period of time can be summed to determine the total amount of time the content item was visible.

An action can be performed based on the amount of time that the content item was visible. For example, the content item may be deleted from a user device or removed from the display in response to determining that the content item has been visible for at least a specified amount of time.

Although the systems and techniques described above have been described in terms of rendering a content item at a display and obtaining a screenshot of the display, similar techniques can be performed without actually rendering the content item at a display. Instead, the content that is to be rendered on a display, including the content item, may be sent to an off screen buffer. The buffer may include data that represents content designated for presentation at the display. An expected screenshot can be obtained from the buffer and analyzed similar to an actual display screenshot, as described above.

Figure 7:
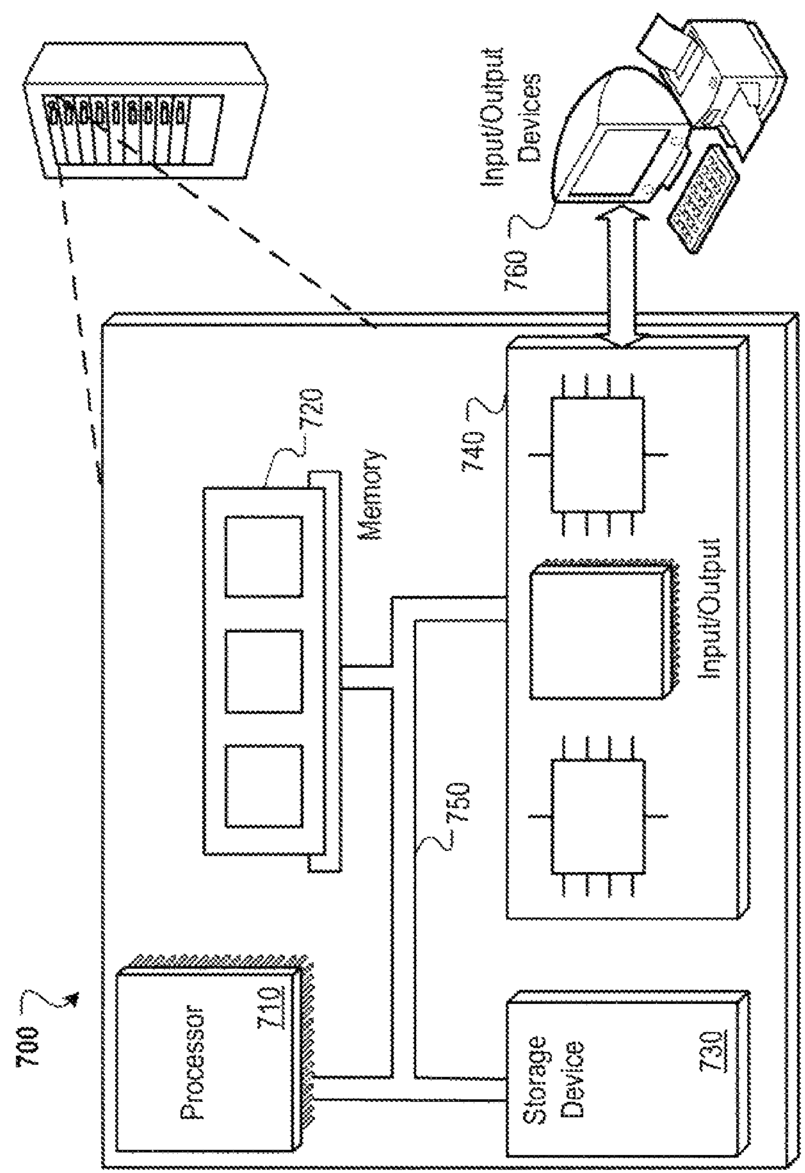
FIG. 7 is a block diagram of an example computer system.

FIG. 7 is a block diagram of an example computer system 700 that can be used to perform operations described above. The system 700 includes a processor 710, a memory 720, a storage device 730, and an input/output device 740. Each of the components 710, 720, 730, and 740 can be interconnected, for example, using a system bus 750. The processor 710 is capable of processing instructions for execution within the system 700. In one implementation, the processor 710 is a single-threaded processor. In another implementation, the processor 710 is a multi-threaded processor. The processor 710 is capable of processing instructions stored in the memory 720 or on the storage device 730.

The memory 720 stores information within the system 700. In one implementation, the memory 720 is a computer-readable medium. In one implementation, the memory 720 is a volatile memory unit. In another implementation, the memory 720 is a non-volatile memory unit.

The storage device 730 is capable of providing mass storage for the system 700. In one implementation, the storage device 730 is a computer-readable medium. In various different implementations, the storage device 730 can include, for example, a hard disk device, an optical disk device, a storage device that is shared over a network by multiple computing devices (e.g., a cloud storage device), or some other large capacity storage device.

The input/output device 740 provides input/output operations for the system 700. In one implementation, the input/output device 740 can include one or more of a network interface device, e.g., an Ethernet card, a serial communication device, e.g., an RS-232 port, and/or a wireless interface device, e.g., an 802.11 card. In another implementation, the input/output device can include driver devices configured to receive input data and send output data to other input/output devices, e.g., keyboard, printer and display devices 760. Other implementations, however, can also be used, such as mobile computing devices, mobile communication devices, set-top box television client devices, etc.

Although an example processing system has been described in FIG. 7, implementations of the subject matter and the functional operations described in this specification can be implemented in other types of digital electronic circuitry, or in computer software, firmware, or hardware, including the structures disclosed in this specification and their structural equivalents, or in combinations of one or more of them.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A system, comprising:

a data processing apparatus; and a memory apparatus in data communication with the data processing apparatus and storing instructions executable by the data processing apparatus and that upon such execution cause the data processing apparatus to perform operations comprising:

generating and transmitting content presentation data comprising a content item and instructions to a user device;

receiving a visual representation of a display of the user device consequent to execution of the instructions by the user device, the received visual representation depicting the display during a temporary state in which a portion of the content item that is designated for presentation in a first color is presented in a second color different from the first color; and determining, using the received visual representation, an amount of the content item visible at the display based on an amount of the portion of the content item that was presented in the second color.

2. The system of claim 1, wherein determining the amount of the content item visible at the display comprises:

identifying a first number of pixels of the content portions changed to the second color;

determining, using the visual representation, a second number of pixel-sized areas that were presented in the second color; and determining the amount of the content item that was visible at the display based on a comparison of the first number to the second number.

3. The system of claim 1, wherein determining the amount of the content item that was visible at the display comprises:

identifying in the visual representation an expected presentation location of the portion of the content item; and determining a number of pixel-sized areas in the expected presentation location that match the second color for the portion of the content item.

4. The system of claim 1, wherein the content item comprises an advertisement, the operations further comprising:

determining that the amount of the advertisement visible at the display satisfies a specified visibility threshold; and generating and transmitting data that indicates that an impression of the advertisement occurred in response to determining that the amount of the content item that was visible at the display satisfies the specified visibility threshold.

5. The system of claim 1, wherein the operations further comprise:

receiving multiple visual representations from the user device, each of the multiple visual representations associated with a timestamp specifying a time at which each of the multiple visual representations was obtained;

determining that one or more of the visual representations include at least a specified amount of the content item; and determining an amount of time that the content item was visible based on the timestamps for each of the one or more visual representations that include at least the specified amount of the content item.

6. The system of claim 5, wherein the operations further comprise generating and transmitting data to the user device that causes the user device to delete the content item in response to determining that the amount of the content item that was visible at the display satisfies a specified visibility threshold and the amount of time the content item was visible satisfies a specified time threshold.

7. The system of claim 1, wherein the second color of the portion of the content item in the received visual representation is created consequent to execution of the instructions by the user device, the instructions comprising adjusting one or more RGB color values that define the first color for the portion of the content item to produce the second color.

8. A non-transitory computer storage medium encoded with a computer program, the program comprising instructions that when executed by a data processing apparatus cause the data processing apparatus to perform operations comprising:

generating and transmitting content presentation data comprising a content item and instructions that causes a user device upon execution of the further instructions to:

present, at a display and over a first time period, the content item that includes a content portion that is designated for presentation in a respective first color for the content portion;

change, for a second time period that is after the first time period, the first color of the content portion to a second color that is different from the first color of the content portion; and generate and provide visual representation data that includes a visual representation of the display during the second time period in which the first color of the content portion is changed to the second color, the visual representation data being provided in response to receiving the content presentation data;

receiving the visual representation data from the user device consequent to execution of the instructions by the user device; and determining, using the visual representation, an amount of the content item that was visible at the display based on an amount of the content portion presented in the second color.

9. A method performed by a data processing apparatus, the method comprising:

generating and transmitting content presentation data comprising a content item and instructions to a user device;

receiving a visual representation of a display of the user device consequent to execution of the instructions by the user device, the received visual representation depicting the display during a temporary state in which a portion of the content item that is designated for presentation in a first color is presented in a second color different from the first color;

identifying a first number of pixels of the content portion changed to the second color;

determining, using the visual representation, a second number of pixel-sized areas that were presented in the second color; and determining, using the received visual representation, an amount of the content item that was visible at the display based on an amount of the portion of the content item that was presented in the second color.

10. The method of claim 9, wherein determining the amount of the content item that was visible at the display further comprises:

identifying in the visual representation an expected presentation location of the portion of the content item; and determining a number of pixel-sized areas in the expected presentation location that match the second color for the content portion.

11. The method of claim 9, wherein the content item comprises an advertisement, the method further comprising:

determining that the amount of the advertisement that was visible at the display satisfies a specified visibility threshold; and generating and transmitting data that indicates that an impression of the advertisement occurred in response to determining that the amount of the content item that was visible at the display satisfies the specified visibility threshold.

12. The method of claim 9, wherein the method further comprises:

receiving multiple visual representations from the user device, each particular visual representation being obtained at different times and being associated with a timestamp that specifies a time at which the particular visual representation was captured;

determining that one or more of the visual representations include at least a specified amount of the content item; and determining an amount of time that the content item was visible based on the timestamps for each of the one or more visual representations that include at least the specified amount of the content item.

13. The method of claim 12, wherein the method further comprises generating and sending data to the user device that causes the user device to delete the content item in response to determining that the amount of the content item that was visible at the display satisfies a specified visibility threshold and the amount of time the content item was visible satisfies a specified time threshold.

14. The method of claim 9, wherein the second color of the portion of the content item in the received visual representation was created consequent to execution of the instructions by the user device, the instructions comprising adjusting one or more RGB color values that define the first color for the portion of the content item to produce the second color.

15. The method of claim 14, wherein each of the one or more RGB color values is adjusted by a specified amount.

16. The method of claim 9, wherein generating the visual representation comprises capturing a screenshot of an area of the display in which the content item is presented.

17. The method of claim 1, wherein execution of the instructions causes the user device to change, after the temporary state of the display, the portion of the content item back to the second color.

18. The method of claim 1, wherein the visual representation of the display comprises data from an off screen buffer of the user device designated for presentation at the display.

* * * * *